United States Patent
Kazmirski et al.

(10) Patent No.: US 9,272,598 B2
(45) Date of Patent: Mar. 1, 2016

(54) SUSPENSION LEVELING SYSTEM

(71) Applicant: Tenneco Automotive Operating Company Inc., Lake Forest, IL (US)

(72) Inventors: Karl Kazmirski, Temperance, MI (US); Rudi Schurmans, Nieuwerkerken (BE); David Blankenship, Canton, MI (US); Scott Dunaway, Carleton, MI (US); Zoren Gaspar, Huron, OH (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/249,461

(22) Filed: Apr. 10, 2014

(65) Prior Publication Data
US 2014/0306409 A1 Oct. 16, 2014

Related U.S. Application Data

(60) Provisional application No. 61/810,302, filed on Apr. 10, 2013.

(51) Int. Cl.
*B60G 17/027* (2006.01)

(52) U.S. Cl.
CPC ........ *B60G 17/0272* (2013.01); *B60G 2202/12* (2013.01); *B60G 2202/413* (2013.01)

(58) Field of Classification Search
CPC ............. B60G 17/015; B60G 2500/30; B60G 2800/914; B60G 17/0272; B60G 2202/413
USPC ........................................................ 280/6.15
See application file for complete search history.

(56) References Cited

U.S. PATENT DOCUMENTS

| | | | | |
|---|---|---|---|---|
| 8,602,428 | B2 * | 12/2013 | Swist | 280/124.136 |
| 8,807,474 | B2 * | 8/2014 | Nash | B65H 19/1852 |
| | | | | 242/555.6 |
| 2009/0062985 | A1 * | 3/2009 | Ohashi et al. | 701/37 |
| 2009/0107784 | A1 * | 4/2009 | Gabriel et al. | 188/313 |
| 2011/0187065 | A1 * | 8/2011 | Van Der Knaap et al. | 280/5.507 |
| 2011/0221109 | A1 | 9/2011 | Hinouchi | |
| 2012/0098216 | A1 * | 4/2012 | Ryan et al. | 280/6.157 |

(Continued)

FOREIGN PATENT DOCUMENTS

| | | |
|---|---|---|
| JP | 2005-121038 | 5/2005 |
| JP | 2005-145295 | 6/2005 |

(Continued)

OTHER PUBLICATIONS

Search Report and Written Opinion in corresponding PCT Application No. PCT/US2014/033610 (11 pages).

*Primary Examiner* — Karen Beck
(74) *Attorney, Agent, or Firm* — Harness, Dickey & Pierce, P.L.C.

(57) ABSTRACT

A vehicle suspension assembly including a first end, a second end, and a hydraulic actuator. The hydraulic actuator is movable between a retracted position providing the vehicle suspension assembly with a first overall length, and an extended position providing the vehicle suspension assembly with a second overall length greater than the first overall length. The vehicle suspension assembly is configured to raise a vehicle when moved from the first overall length to the second overall length by the hydraulic actuator. The vehicle suspension assembly is configured to lower the vehicle when moved from the second overall length to the first overall length by the hydraulic actuator.

4 Claims, 12 Drawing Sheets

(56) References Cited

U.S. PATENT DOCUMENTS

| | | | |
|---|---|---|---|
| 2013/0020748 A1* | 1/2013 | Kohlhauser | B60G 15/063 267/217 |
| 2014/0097589 A1* | 4/2014 | Swist | 280/124.128 |
| 2014/0125017 A1* | 5/2014 | Kasuga et al. | 280/5.514 |
| 2014/0175764 A1* | 6/2014 | Murakami et al. | 280/5.514 |
| 2014/0306409 A1* | 10/2014 | Kazmirski et al. | 280/6.15 |
| 2014/0353934 A1* | 12/2014 | Yabumoto | 280/5.515 |
| 2015/0028551 A1* | 1/2015 | Reybrouck | 280/5.508 |

FOREIGN PATENT DOCUMENTS

| | | |
|---|---|---|
| JP | 2005-280514 | 10/2005 |
| JP | 2010-000857 | 1/2010 |

* cited by examiner

SUSPENSION LEVELING SYSTEM

CROSS-REFERENCE TO RELATED APPLICATIONS

This application claims the benefit of U.S. Provisional Application No. 61/810,302 filed on Apr. 10, 2013, the entire disclosure of which is incorporated herein by reference.

FIELD

The present disclosure relates to a suspension leveling system.

BACKGROUND

This section provides background information related to the present disclosure, which is not necessarily prior art.

Devices for raising and lowering a vehicle, such as to increase or decrease ground clearance, often include a pneumatic spring movable between a raised position, a lowered position, and a plurality of intermediate positions. In order to determine the height of the pneumatic spring, a height sensor is typically required. Such pneumatic springs with multiple intermediate positions are typically complex and expensive, and must often be controlled by an expensive and complex control device. A simplified and more cost effective device and system for raising and lowering a vehicle would thus be desirable.

SUMMARY

This section provides a general summary of the disclosure, and is not a comprehensive disclosure of its full scope or all of its features.

The present teachings provide for a vehicle suspension assembly including a first end, a second end, and a hydraulic actuator. The hydraulic actuator is movable between a retracted position providing the vehicle suspension assembly with a first overall length, and an extended position providing the vehicle suspension assembly with a second overall length greater than the first overall length. The vehicle suspension assembly is configured to raise a vehicle when moved from the first overall length to the second overall length by the hydraulic actuator. The vehicle suspension assembly is configured to lower the vehicle when moved from the second overall length to the first overall length by the hydraulic actuator.

The present teachings further provide for a vehicle suspension assembly including a first suspension mount at a first end, a second suspension mount at a second end that is opposite to the first end, a spring between the first end and the second end, and a hydraulic actuator. The hydraulic actuator is movable exclusively between a retracted position providing the vehicle suspension assembly with a first overall length, and an extended position providing the vehicle suspension assembly with a second overall length greater than the first overall length. The vehicle suspension assembly is one of a shock, strut, or damperless spring. The vehicle suspension assembly is configured to raise a vehicle when moved from the first overall length to the second overall length by the actuator. The vehicle suspension assembly is configured to lower the vehicle when moved from the second overall length to the first overall length by the actuator.

The present teachings also provide for a vehicle suspension system including a vehicle suspension assembly and a controller. The vehicle suspension assembly includes a first end, a second end, and a hydraulic actuator. The controller is configured to move the hydraulic actuator exclusively between a retracted position in which the vehicle suspension assembly has a first overall length, and an extended position in which the vehicle suspension assembly has a second overall length greater than the first overall length. The vehicle suspension assembly is configured to raise a vehicle when moved from the first overall length to the second overall length. The vehicle suspension assembly is configured to lower the vehicle when moved from the second overall length to the first overall length.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
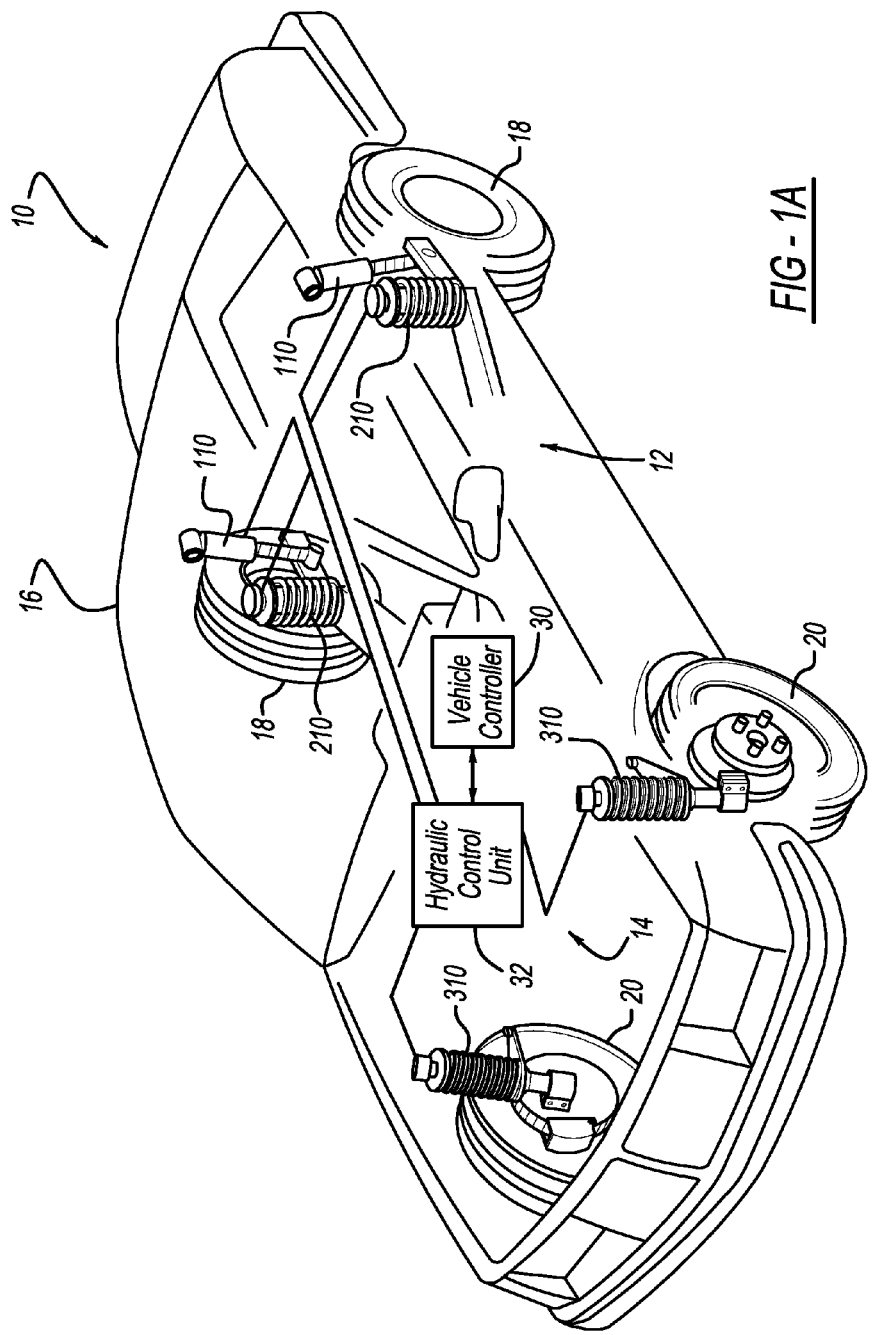
FIG. 1A illustrates an exemplary vehicle including suspension assemblies according to the present teachings.
Figure 1B:
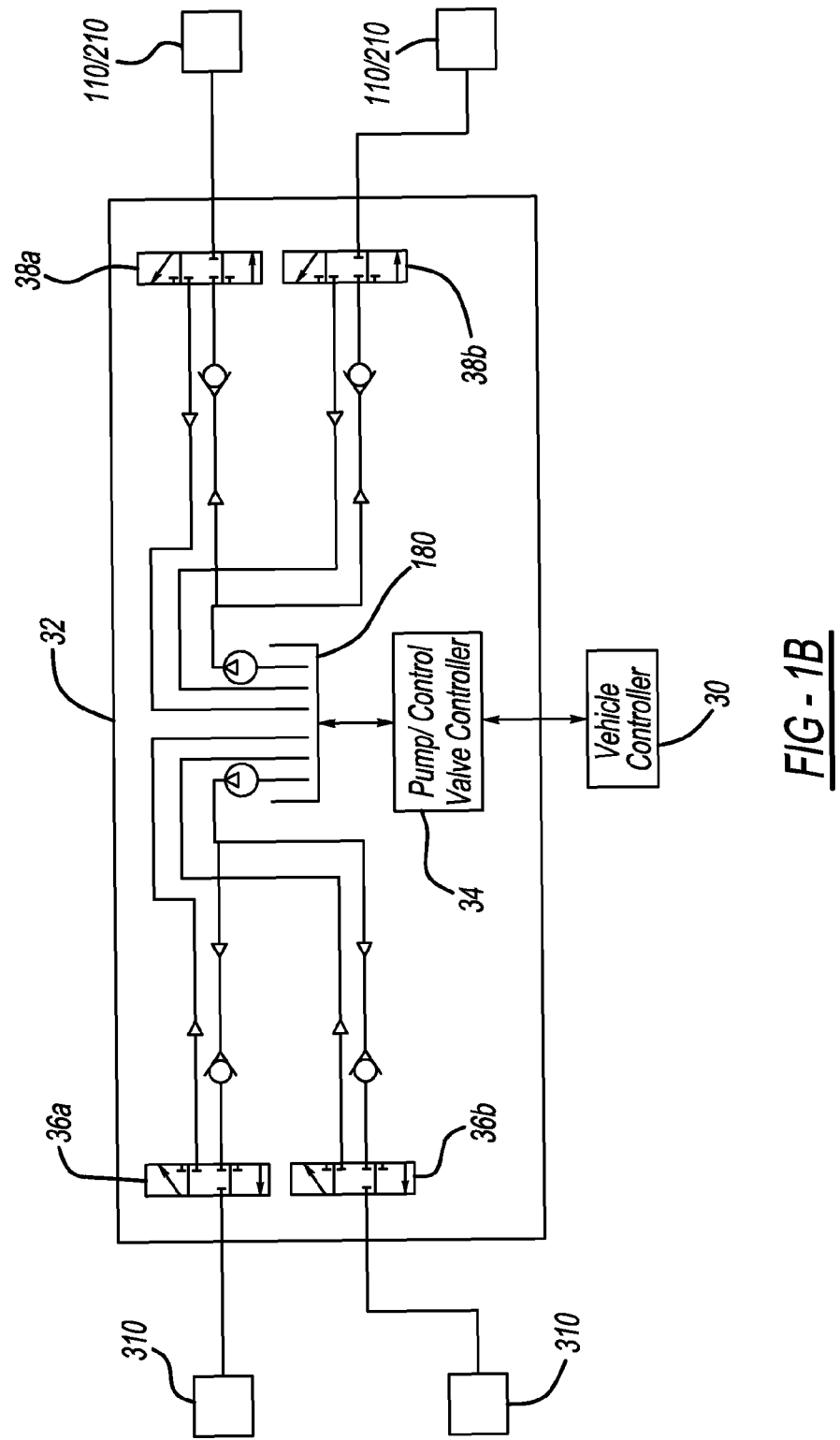
FIG. 1B illustrates a system for controlling the suspension assemblies according to the present teachings.

With initial reference to FIGS. 1A and 1B, a vehicle including a vehicle suspension leveling system according to the present teachings is generally illustrated at reference numeral 10. The vehicle 10 generally includes a rear suspension 12, a front suspension 14, and a body 16. The rear suspension 12 has a rear axle assembly (not shown) adapted to operatively support the vehicle's rear wheels 18. The rear axle assembly is operatively connected to body 16 by first suspension assemblies 110 and second suspension assemblies 210. The front suspension 14 similarly includes a transversely extending front axle assembly (not shown) to operatively support front wheels 20 of the vehicle 10. The front axle assembly is operatively connected to body 16 by third suspension assemblies 310. The first and the third suspension assemblies 110 and 310 serve to damp relative motion of an unsprung portion (i.e. front and rear suspensions 12 and 14, respectively) and a sprung portion (i.e. body 16) of vehicle 10.

Although the vehicle 10 is illustrated as a passenger car having front and rear axle assemblies, the suspension assemblies 110, 210, and 310 may be used with other types of vehicles and/or in other types of applications, such as vehicles incorporating independent front and/or independent rear suspension systems. Furthermore, although the vehicle 10 is illustrated as including a pair of each one of the suspension assemblies 110, 210, and 310, the vehicle 10 can include any suitable combination of the suspension assemblies 110, 210, and/or 310. For example, the first and second suspension assemblies 110 and 210 as illustrated can be replaced with the third suspension assemblies 310. Furthermore, the third suspension assemblies 310 can each be replaced with the first and the second suspension assemblies 110 and 210.

As described herein, the suspension assemblies 110, 210, and 310 are included with a suspension leveling system and are configured to raise and lower the vehicle 10. The vehicle 10 further includes a vehicle controller 30 configured to control operation of the suspension assemblies 110, 210, and 310 with respect to raising and lowering of the vehicle 10. Specifically, the vehicle controller 30 is configured to send commands to a hydraulic control unit 32 for raising and lowering the vehicle 10. The hydraulic control unit 32 generally includes a pump/control valve controller 34, one or more pumps 180, a first front valve 36a, a second front valve 36b, a first rear valve 38a, and a second rear valve 38b. The valves 36a, 36b, 38a, and 38b can be any suitable valves, such as three-port, three-way control valves as illustrated. The vehicle controller 30 can be any suitable controller, such as a microcontroller or microprocessor. The pump/control valve controller 34 can be any suitable controller.

To raise the vehicle 10, the vehicle controller 30 transmits any suitable "raise" command to the hydraulic control unit 32, and specifically to the pump/control valve controller 34 thereof. Upon receipt of the "raise" command, the pump/control valve controller 34 operates the pump 180 to pump hydraulic fluid to one or more of the suspension assemblies 110, 210, or 310, and actuates the valves 36a, 36b, 38a, and 38b as appropriate to permit passage of hydraulic fluid therethrough. As explained in detail herein, the hydraulic fluid is received by hydraulic actuators 150, 314/340, 410 at the suspension assemblies 110, 210, or 310, which raise the suspension assemblies 110, 210, or 310 as commanded in order to raise the vehicle 10.

To lower the vehicle 10, the vehicle controller 30 transmits any suitable "lower" command to the hydraulic control unit 32, and specifically to the pump/control valve controller 34 thereof. Upon receipt of the "lower" command, the pump/control valve controller 34 releases and/or pumps hydraulic fluid from one or more of the suspension assemblies 110, 210, or 310, and closes the valves 36a, 36b, 38a, or 38b as appropriate. Withdrawal of the hydraulic fluid from the hydraulic actuators 150, 314/340, 410 lowers the vehicle 10. The pump/control valve controller 34 is configured to actuate any one of the valves 36a, 36b, 38a, or 38b individually as appropriate to raise or lower any one or more of the suspension assemblies 110, 210, or 310, and thus raise or lower one or more corners of the vehicle 10.

Figure 2A:
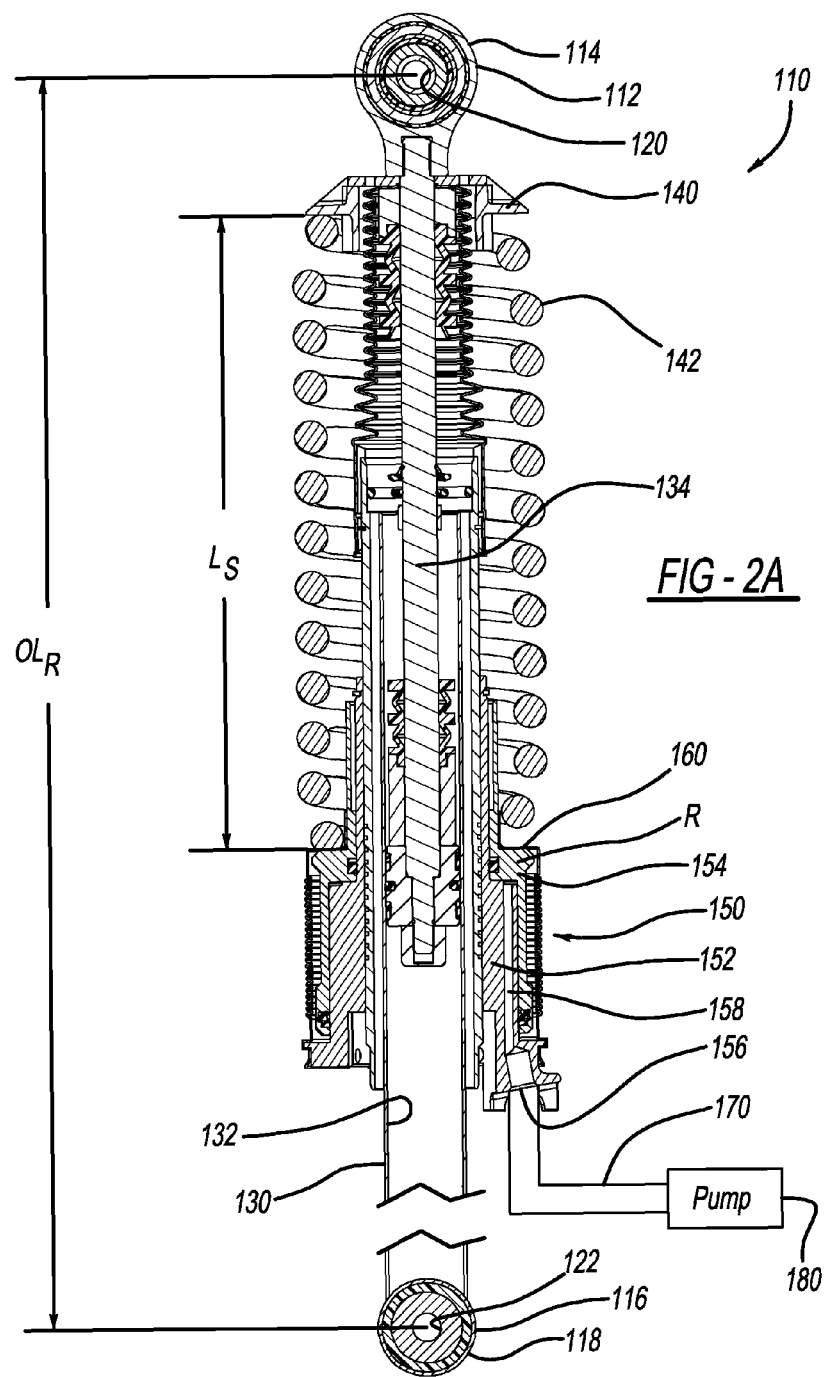
FIG. 2A is a cross-sectional view of a suspension assembly according to the present teachings in a retracted position.
Figure 2B:
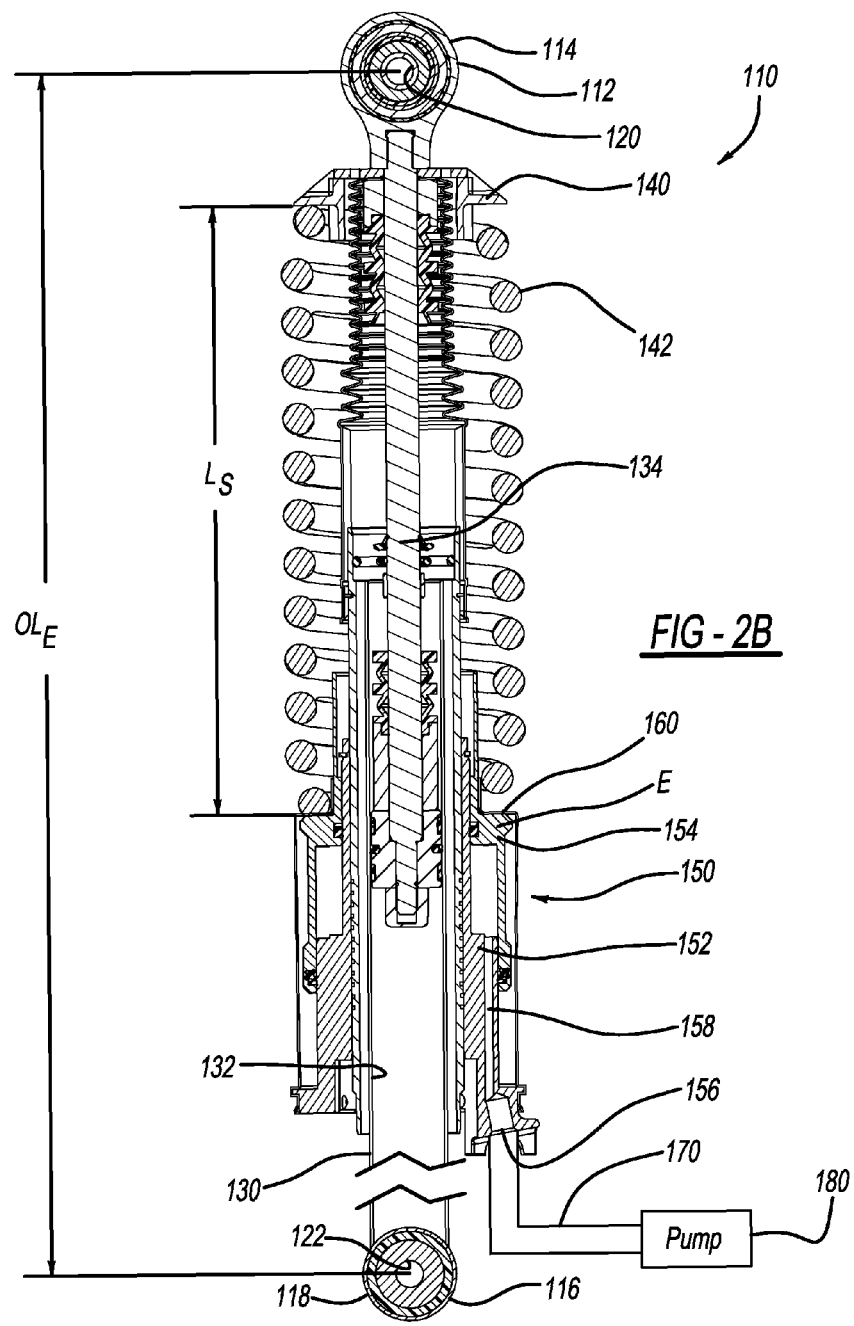
FIG. 2B is a cross-sectional view of the suspension assembly of FIG. 2A in an extended position.

With reference to FIGS. 2A and 2B, a cross-sectional view of one of the first suspension assemblies is illustrated at reference numeral 110. The other one of the first suspension assemblies can be similar to, or the same as, the illustrated first suspension assembly 110. The first suspension assembly 110 is generally a shock and includes an upper mount 112 at a first or upper end 114 of the first suspension assembly 110, and a lower mount 116 at a second or lower end 118 of the first suspension assembly 110. The first or upper end 114 is generally opposite to the second or lower end 118. The upper mount 112 includes a first mounting location, which can generally define a first aperture 120 as illustrated, or have any other suitable configuration. The lower mount 116 includes a second mounting location, which can generally define a second aperture 122 as illustrated, or have any other suitable configuration. The first and second apertures 120 and 122 are each configured to cooperate with suitable fastening devices in order to secure the first suspension assembly 110 to the vehicle 10, as is commonly known in the art.

A damper tube 130 extends from the lower mount 116 towards the first or upper end 114. The damper tube 130 defines a damper chamber 132. The damper chamber 132 can be filled with any suitable damping substance, such as air or gas. Slidably mounted within the damper chamber 132 is a damper rod 134. The damper rod 134 extends out from within the damper chamber 132, and to an upper spring seat 140. The upper mount 112 extends from the upper spring seat 140, and the damper rod 134 is coupled to one or both of the upper spring seat 140 and the upper mount 112.

Extending from the upper spring seat 140 towards the lower mount 116 and the lower end 118 is a spring 142. The spring 142 extends to a hydraulic actuator 150, which is mounted to the damper tube 130 proximate to the lower mount 116. The hydraulic actuator 150 can be any suitable hydraulic actuator. Furthermore, although the hydraulic actuator 150 is described herein as being of the hydraulic type, the hydraulic actuator 150 can be any suitable actuator, and thus need not be hydraulic.

The hydraulic actuator 150 generally includes a first portion 152 and a second portion 154. The first portion 152 is rigidly mounted to the damper tube 130, and the second portion 154 is slidably mounted relative to the first portion 152. The second portion 154 is configured to slidably move away from the first portion 152 upon introduction of hydraulic fluid between the first and second portions 152 and 154. The hydraulic fluid is input at inlet 156 of the first portion 152. The first portion 152 defines a conduit 158 extending therethrough from the inlet 156 to an area or space defined between the first and second portions 152 and 154. The spring 142 extends to the second portion 154, and specifically to a lower spring seat 160 of the second portion 154.

Hydraulic fluid is conveyed to and from the inlet 156 by way of a hydraulic line 170, which is coupled to a pump 180, such as a hydraulic pump. The pump 180 may be any suitable type of hydraulic pump, or any other type of pump if the actuator 150 is a non-hydraulic actuator. For example, the pump 180 can be a pump with local control, having pressure and/or current feedback. Thus, the relative positions of the first and second portions 152 and 154 is set based on pressure and/or current feedback. The vehicle 10 may include a dedicated pump 180 for each one of the first, second, and third suspension assemblies 110, 210, and 310; two or more pumps 180 each in communication with more than one of the suspension assemblies 110, 210, 310; or one pump 180 can be provided with multiple hydraulic lines 170 extending to each one of the first, second, or third suspension assemblies 110, 210, or 310, as illustrated in FIGS. 1A and 1B. The pump 180 can be located at any suitable position throughout the vehicle 10, and the vehicle 10 can include multiple pumps 180 configured to pump hydraulic fluid to any one or more of the first, second, or third suspension assemblies 110, 210, 310.

Operation of the first suspension assembly 110 will now be described. FIG. 2A illustrates the first suspension assembly 2A in a retracted position, with the hydraulic actuator 150 at retracted position R. In the retracted position R, the first suspension assembly includes an overall length of $OL_R$. The overall length in the retracted position $OL_R$ can be measured between any suitable points along a length of the first suspension assembly 110, such as between the upper and lower mounts 112 and 116, such as between the first mounting location 120 and the second mounting location 122.

Upon receipt of a request from the vehicle controller 30, the pump 180 is configured to pump hydraulic fluid through the hydraulic line 170 and to the inlet 156, as directed by the hydraulic control unit 32. From the inlet 156 the hydraulic fluid flows through the conduit 158 to an area between the first and second portions 152 and 154 of the hydraulic actuator 150. As hydraulic fluid fills the area between the first and second portions 152 and 154, the second portion 154 is moved away from the first portion 152, and away from the lower mount 116. The second portion 154 will continue to move away from the lower mount 116 until the hydraulic actuator 150 reaches the extended position E of FIG. 2B.

Movement of the hydraulic actuator 150 to the extended position E increases the overall length of the first suspension assembly 110 from the $OL_R$ of FIG. 2A to the overall extended length $OL_E$ of FIG. 2B. Thus movement of the hydraulic actuator 150 to the extended position E increases the height of the vehicle 10 by an amount equal to the difference between the overall length in the retracted position $OL_R$ and the overall length in the extended position $OL_E$. The difference between the overall length in the retracted position $OL_R$ and the overall length in the extended position $OL_E$ can be any suitable distance, such as less than three inches, three inches, four inches, five inches, six inches, or greater.

After moving the hydraulic actuator 150 to the extended position E, the pump 180 can release hydraulic fluid, or pump hydraulic fluid out from within, the area between the first and second portions 152 and 154 of the hydraulic actuator 150, thus allowing the second portion 154, and the actuator 150 generally, to return to the retracted position R (FIG. 2B), which will reduce the overall length of the first suspension assembly 110 to the overall length in the retracted position $OL_R$. Throughout movement of the hydraulic actuator 150 between the retracted position R and the extended position E, the spring 142 remains at a constant length $L_S$.

The vehicle controller 30, the hydraulic control unit 32, the pump/control valve controller 34, and the pump 180 are configured to move the hydraulic actuator 150 exclusively between the retracted position R (FIG. 2A) and the extended position E (FIG. 2B). Thus the vehicle controller 30, the hydraulic control unit 32, the pump/control valve controller 34, and the pump 180 can be simplified, thereby reducing the cost of the components and increasing reliability. For example, no metering or measuring device, such as a height sensor, is needed to determine the position of the hydraulic actuator 150, and/or set the hydraulic actuator 150 at one or more intermediate positions between the retracted position R and the extended position E. The pump/control valve controller 34 and the pump 180 rely on pressure and/or current feedback to determine when the second portion 154 reaches the extended position E.

Figure 3A:
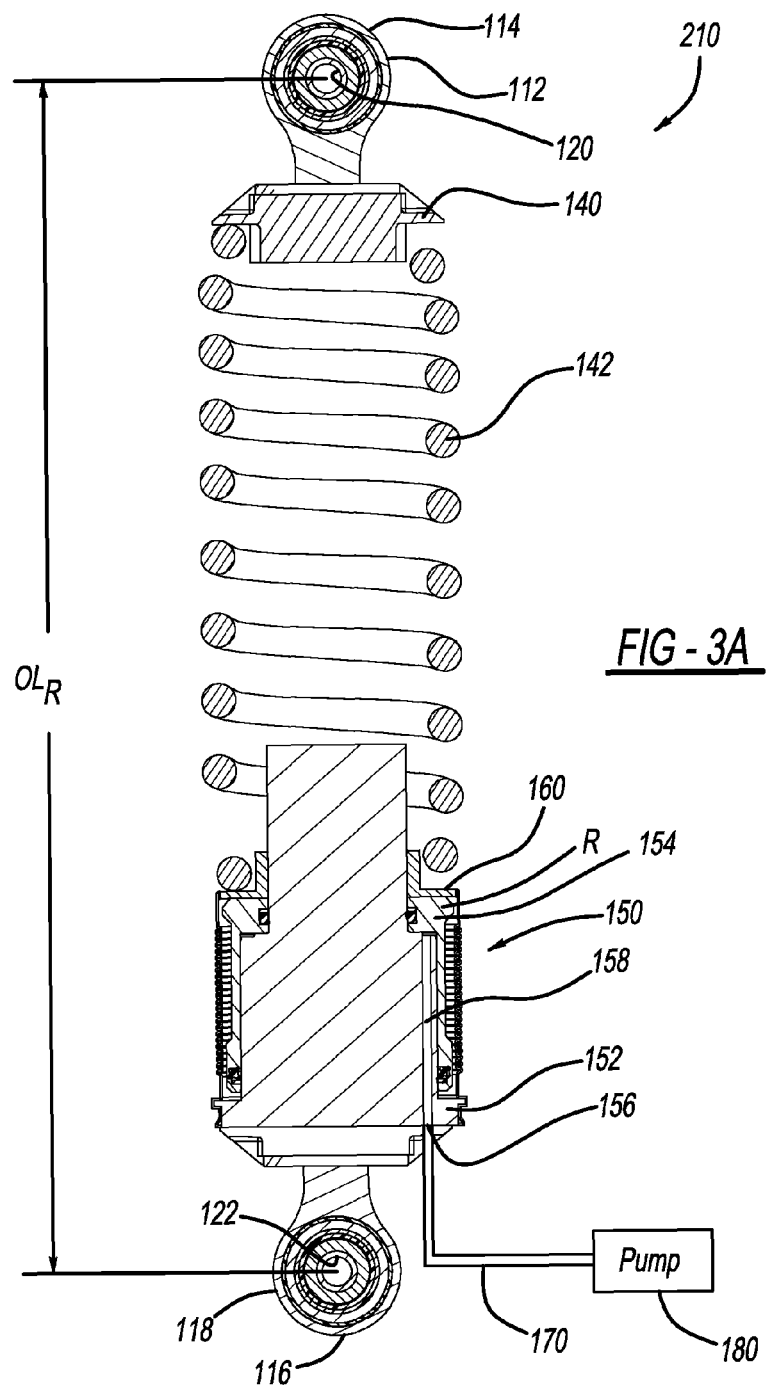
FIG. 3A is a cross-sectional view of another suspension assembly according to the present teachings in a retracted position.
Figure 3B:
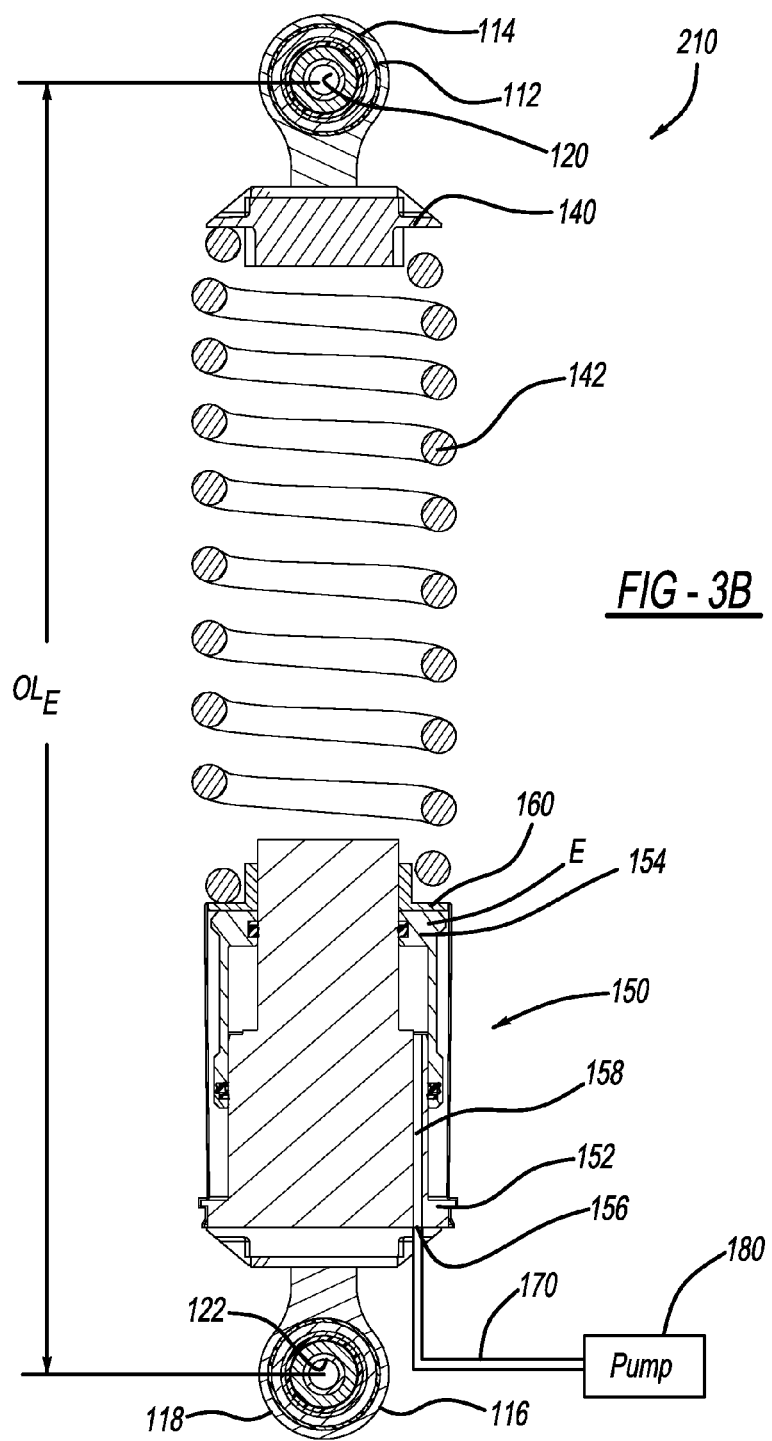
FIG. 3B is a cross-sectional view of the suspension assembly of FIG. 3A in an extended position.

With reference to FIGS. 3A and 3B, a cross-sectional view of a second suspension assembly according to the present teachings is illustrated at reference numeral 210. The second suspension assembly 210 includes many features in common with the first suspension assembly 110. Therefore, the common features are illustrated with like reference numerals, and the description of the common features set forth above in the discussion of the first suspension assembly 110 also applies to the second suspension assembly 210.

The second suspension assembly 210 differs from the first suspension assembly 110 in that the second suspension assembly 210 is a standalone spring without a damper, as opposed to the first suspension assembly 110, which is generally a shock including the damper tube 130, the damper chamber 132, and the damper rod 134. Thus with the second suspension assembly 210, an interior of the spring 142 is generally empty between the upper spring seat 140 and the lower spring seat 160.

The second suspension assembly 210 further differs from the first suspension assembly 110 in that the actuator 150 is arranged such that the first portion 152 is coupled to, or integral with, the lower mount 116 in the example illustrated in FIGS. 3A and 3B. Like the first suspension assembly 110, however, the second suspension assembly 210 includes the hydraulic actuator 150 movable between the retracted position R (FIG. 3A) and the extended position E (FIG. 3B). In the retracted position R, the second suspension assembly 210 is provided with an overall length $OL_R$ that is less than an overall length $OL_E$ when the hydraulic actuator 150 is in the extended position E of FIG. 3B.

Figure 3C:
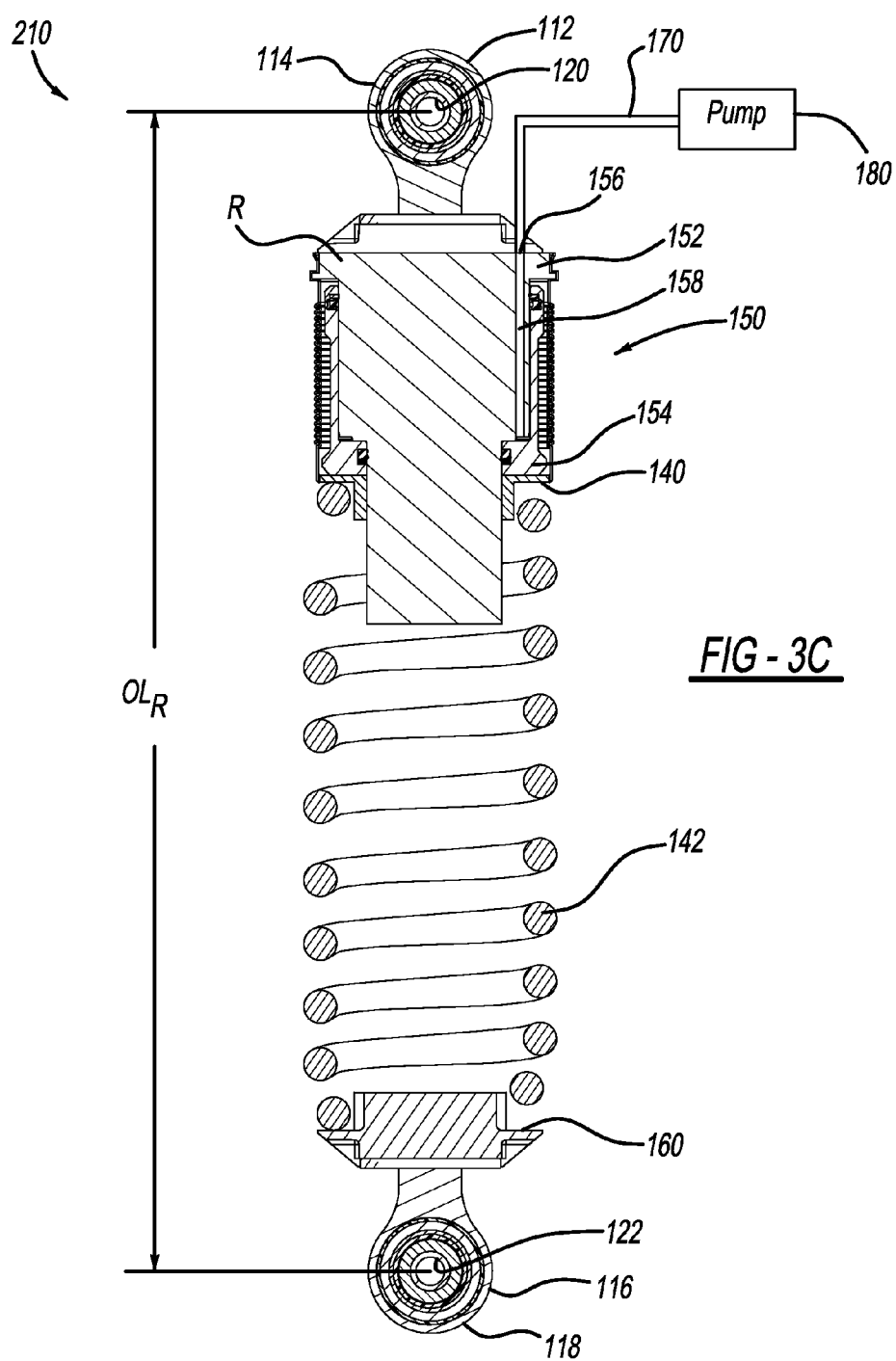
FIG. 3C is a perspective view of yet another suspension assembly according to the present teachings in a retracted position.
Figure 3D:
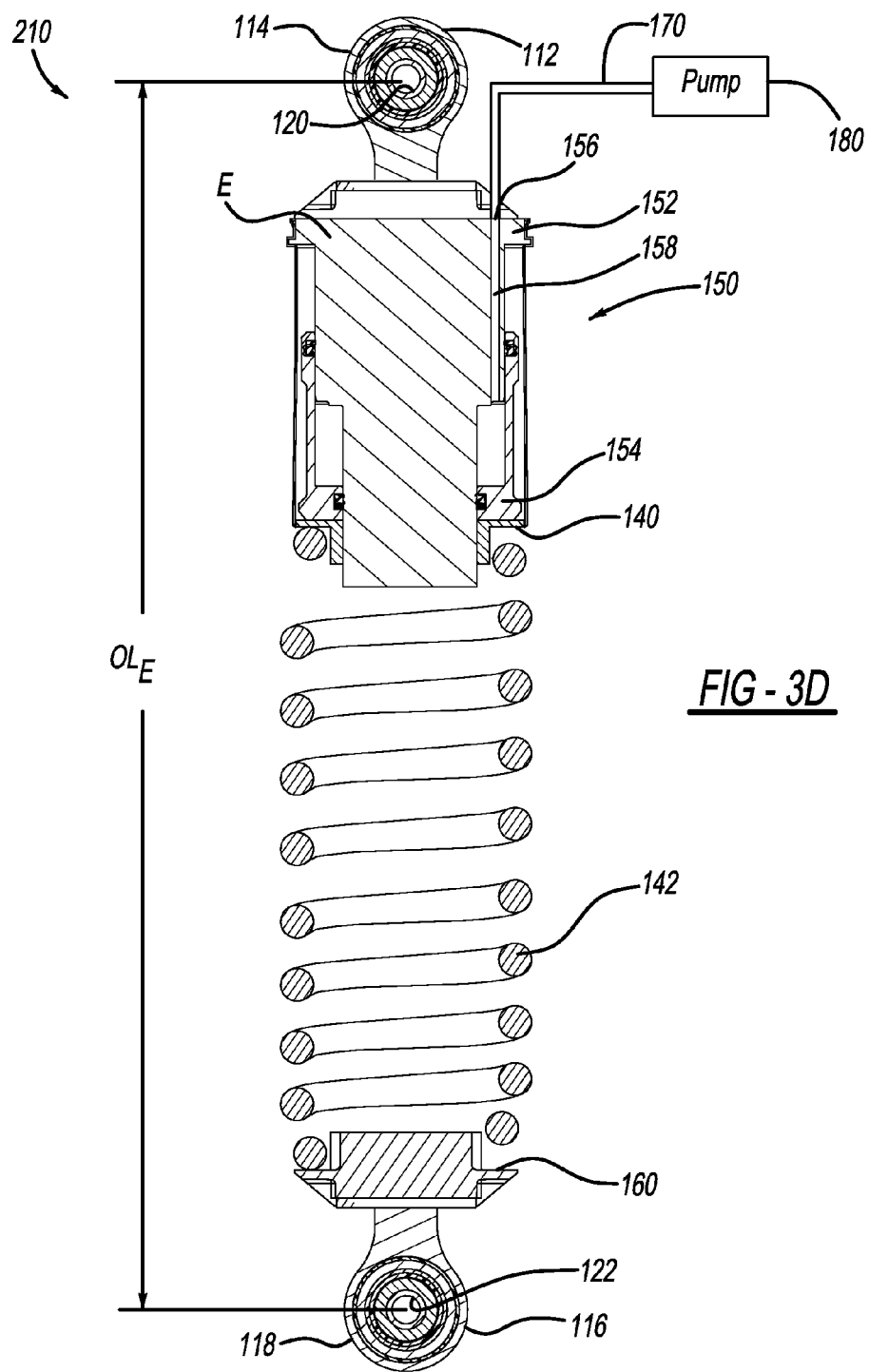
FIG. 3D is a cross-sectional view of the suspension assembly of FIG. 3C in an extended position.

Although FIGS. 3A and 3B illustrate the actuator 150 of the second suspension assembly 210 proximate to the lower mount 116 and with the lower spring seat 160 at the second portion 154 of the hydraulic actuator 150, the hydraulic actuator 150 can be arranged at the first end 114 of the second suspension assembly 210 proximate to the upper mount 112, as illustrated in FIGS. 3C and 3D. As illustrated in FIGS. 3C and 3D, the hydraulic actuator 150 can include the upper spring seat 140 at the second portion 154 thereof. Upon movement of the actuator 150 from the retracted position R of FIG. 3C to the extended position E of FIG. 3D, the first and the second portions 152 and 154 move apart to increase the overall length of the second suspension assembly 210 from the overall length in the retracted position $OL_R$ to the overall length of the extended position $OL_E$.

Figure 4A:
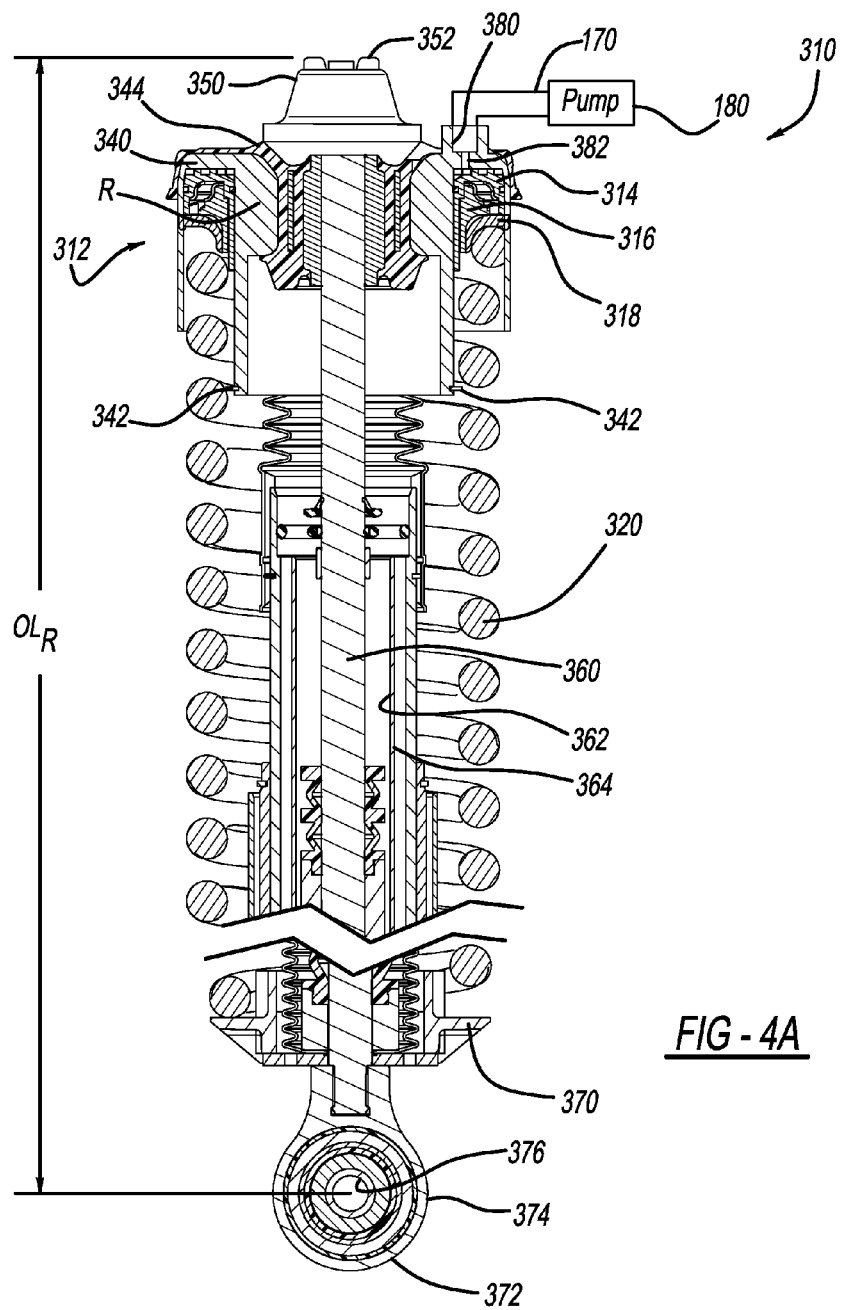
FIG. 4A is still another suspension assembly according to the present teachings in a retracted position.
Figure 4B:
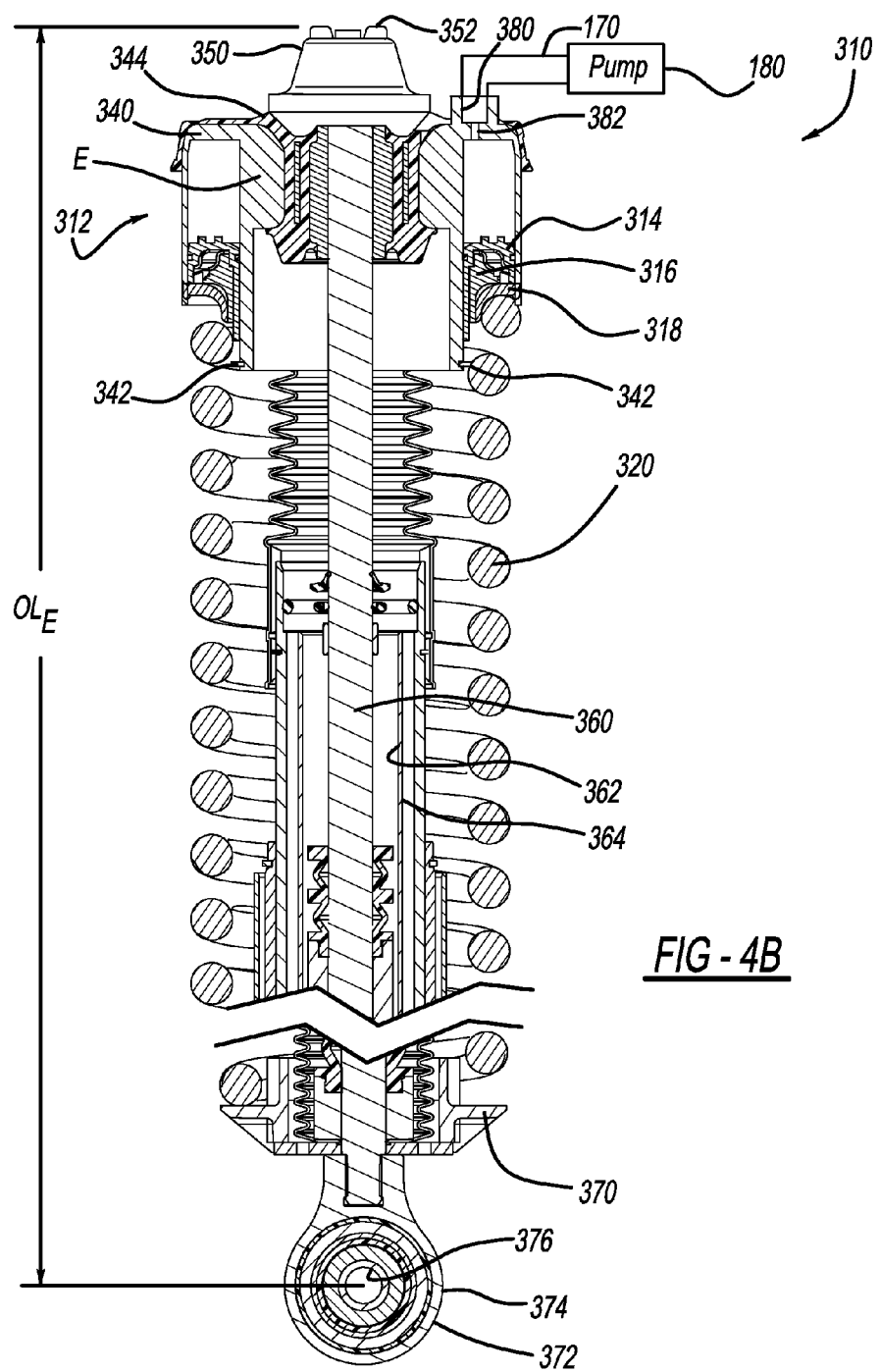
FIG. 4B is a cross-sectional view of the suspension assembly of FIG. 4A in an extended position.

With reference to FIGS. 4A and 4B, a cross-sectional view of the third suspension assembly according to the present teachings is generally illustrated at reference numeral 310. The third suspension assembly 310 is generally a strut, which acts as both a damper and a structural support for the vehicle 10.

The third suspension assembly 310 includes a strut mount 312. The strut mount 312 generally includes an upper bearing support and piston 314, a bearing lower support 316, and an upper spring seat 318. Each one of the upper bearing support and piston 314, the bearing lower support 316, and the upper spring seat 318 are generally circular ("dough-nut shaped"). The upper spring seat 318 is coupled to the bearing lower support 316, which is coupled to the upper bearing support and piston 314. The upper spring seat 318 provides a seat for spring 320. The upper bearing support and piston 314 generally defines an opening in which a cylinder housing 340 is slidably seated therein.

The cylinder housing 340 is movable between a retracted position R (FIG. 4A) and an extended position E (FIG. 4B). The cylinder housing 340 and the upper bearing support and piston 314 generally provide a hydraulic actuator, with the upper bearing support and piston 314 being a first portion of the actuator, and the cylinder housing 340 being a second portion of the hydraulic actuator. The cylinder housing 340 includes a piston stop ring 342, which can provide a stop for the cylinder housing 340 when the piston stop ring 342 abuts the upper bearing support and piston 314 when in the extended position E.

The cylinder housing 340 further includes a rubber journal 344. At the rubber journal 344 is a suspension mount 350, which is at a first end 352 of the third suspension assembly 310. The suspension mount 350 is configured to be coupled to the suspension of the vehicle 10 in any suitable manner.

Extending from the suspension mount 350 and the rubber journal is a damper rod 360. The damper rod 360 extends through a damper chamber 362 defined by damper tube 364 towards a second or lower end 372 of the third suspension assembly 310. The lower end 372 is opposite to the first end 352, which can be an upper end. Proximate to the lower end 372 is a lower spring seat 370, against which is seated the spring 320. At the lower end 372 is a lower mount 374, which can be any suitable mount for coupling to the vehicle 10. For example, the lower mount 374 can define an aperture 376, which is configured to cooperate with any suitable coupling member for coupling the lower mount 374 to the suspension of the vehicle 10.

The pump 180 is operated by the hydraulic control unit 32 in the same manner described above with respect to the previously described suspension assemblies 110 and 210 according to the present teachings. When the hydraulic control unit 32 commands the pump 180 to pump hydraulic fluid through the hydraulic line 170, the hydraulic fluid is delivered to an inlet 380 of the cylinder housing 340. The hydraulic fluid flows through a conduit 382 defined by the cylinder housing 340 to an area between the cylinder housing 340 and the upper bearing support and piston 314. As the hydraulic fluid fills the area between the cylinder housing 340 and the upper bearing support and piston 314, the cylinder housing 340 moves from the retracted position R of FIG. 4A to the extended position E of FIG. 4B.

In the extended position E, the strut mount 312 increases in height, and increases the overall length of the third suspension assembly 310 from the overall length in the retracted position $OL_R$ of FIG. 4A to the overall length in the extended position $OL_E$ of FIG. 4B. The pump 180 pumps hydraulic fluid, or releases hydraulic fluid, out from between the upper bearing support and piston 314 and the cylinder housing 340 to allow the cylinder housing 340 to return to the retracted position R of FIG. 4A. Similar to the first and the second suspension assemblies 110 and 210, movement of the strut mount 312 to the extended position E of FIG. 4B raises the vehicle 10. Return of the strut mount 312 to the retracted position R of FIG. 4A lowers the vehicle 10.

Figure 5A:
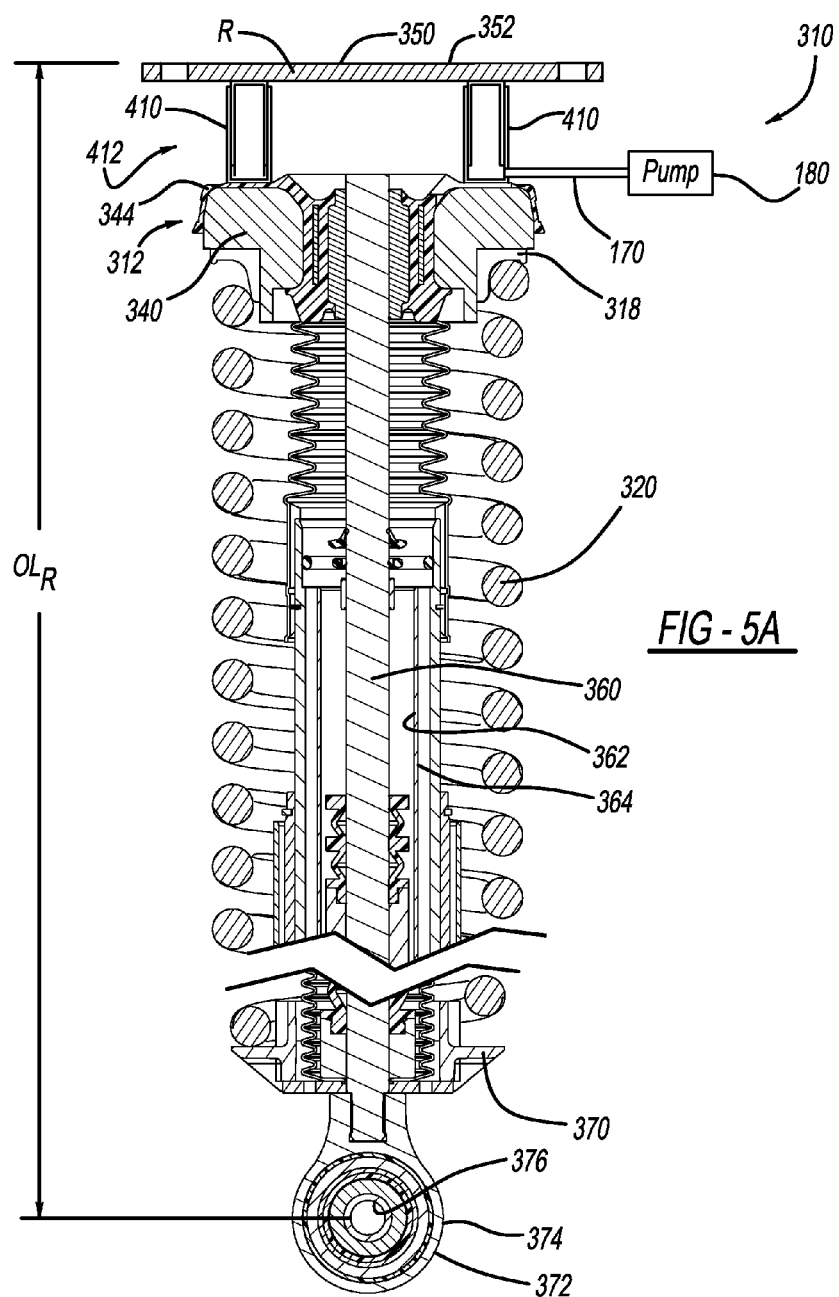
FIG. 5A is a cross-sectional view of an additional suspension assembly according to the present teachings in a retracted position.
Figure 5B:
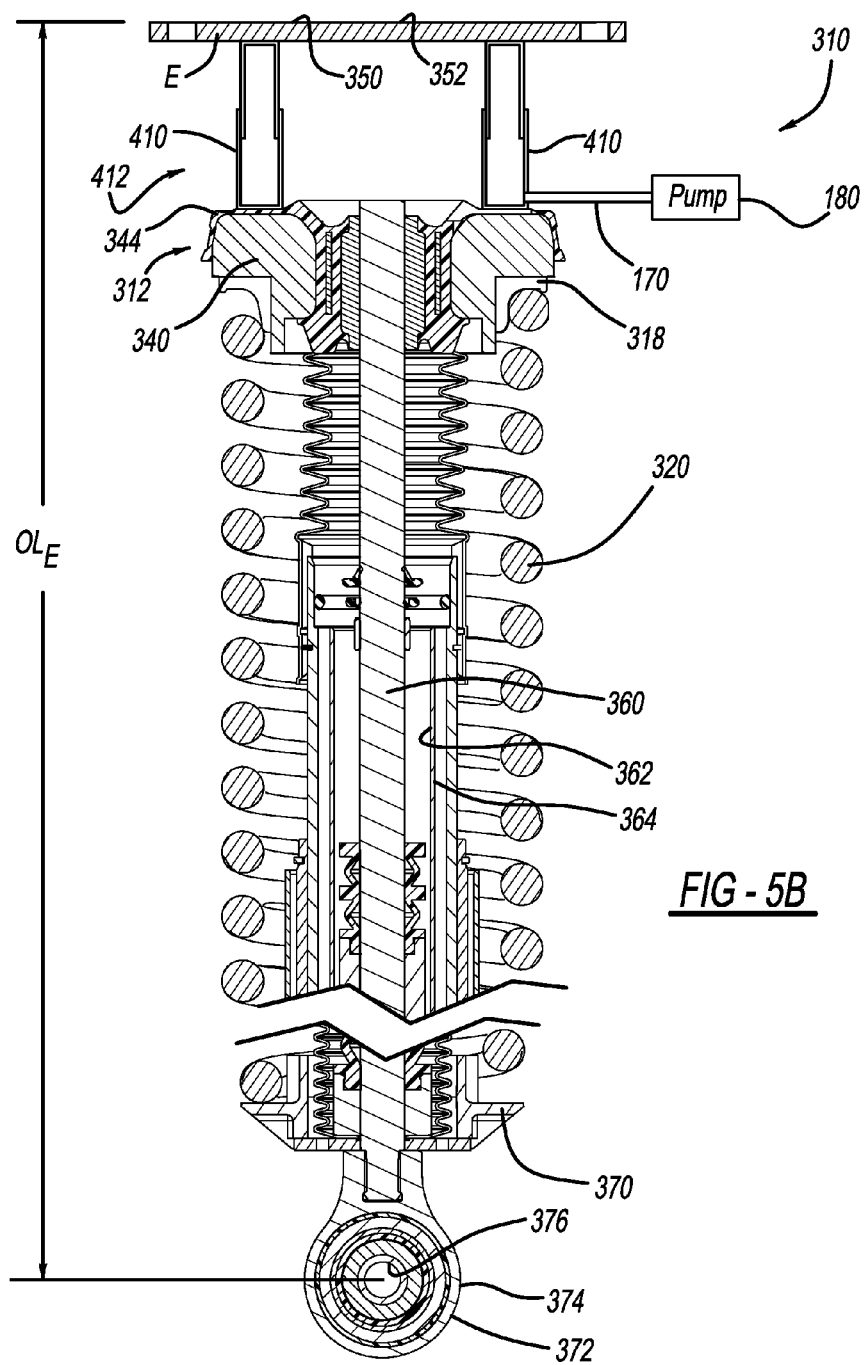
FIG. 5B illustrates the suspension assembly of 5A in an extended position.

With additional reference to FIGS. 5A and 5B, the third suspension assembly 310 can be configured such that the cylinder housing 340 does not actuate, in contrast to the example of FIGS. 4A and 4B. In the example of FIGS. 5A and 5B, the cylinder housing 340 can be stationary and one or more hydraulic actuators 410 can be arranged on the cylinder housing 340 proximate to the first end 352 of the third suspension assembly 310. The suspension mount 350 can be modified and coupled to the actuators 410 as illustrated in FIGS. 5A and 5B.

The hydraulic actuators 410 are similar to the actuators described above, such as the actuator 150. The hydraulic actuators 410 are thus configured to receive hydraulic fluid from the pump 180 in a manner similar to the actuators described above, such as the actuator 150. The actuators 410 are movable exclusively between a retracted position R of FIG. 4A and an extended position E of FIG. 5B. In the extended position E, the overall length of the third suspension assembly 310 increases to $OL_E$, which increases the overall length of the third suspension assembly 310 relative to the overall length in the retracted position $OL_R$, and raises the vehicle 10. Return of the actuators 410 to the retracted position R lowers the vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle suspension assembly comprising:
   an upper mount;
   a lower mount;
   a shock absorber extending between the upper and lower mounts, the shock absorber including a damper tube having an upper end and a lower end, the lower end being opposite to the upper end and adjacent to the lower mount; and
   a hydraulic actuator movable between a retracted position providing the vehicle suspension assembly with a first overall length, and an extended position providing the vehicle suspension assembly with a second overall length greater than the first overall length;
   wherein:
      the entire hydraulic actuator is disposed between the upper and lower ends of the damper tube;
      the vehicle suspension assembly is configured to raise a vehicle when moved from the first overall length to the second overall length by the hydraulic actuator;
      the vehicle suspension assembly is configured to lower the vehicle when moved from the second overall length to the first overall length by the hydraulic actuator; and
      the damper tube extends entirely through the hydraulic actuator.

2. The vehicle suspension assembly of claim 1, wherein the hydraulic actuator includes a first portion rigidly mounted to the damper tube, and a second portion slidably mounted to the first portion.

3. The vehicle suspension assembly of claim 2, wherein the second portion is configured to slidably move away from the first portion upon introduction of hydraulic fluid between the first portion and the second portion.

4. A vehicle suspension assembly comprising:
   an upper mount;
   a lower mount;
   a shock absorber extending between the upper and lower mounts, the shock absorber including a damper tube having an upper end and a lower end, the lower end being opposite to the upper end and adjacent to the lower mount; and
   a hydraulic actuator movable between a retracted position providing the vehicle suspension assembly with a first overall length, and an extended position providing the vehicle suspension assembly with a second overall length greater than the first overall length;
   wherein:
      the entire hydraulic actuator is disposed between the upper and lower ends of the damper tube;
      the vehicle suspension assembly is configured to raise a vehicle when moved from the first overall length to the second overall length by the hydraulic actuator;
      the vehicle suspension assembly is configured to lower the vehicle when moved from the second overall length to the first overall length by the hydraulic actuator;
      the hydraulic actuator includes a first portion rigidly mounted to the damper tube, and a second portion slidably mounted to the first portion; and
      a spring extends between the upper portion and an upper spring seat at the upper mount.

* * * * *